Aug. 26, 1958   T. R. SMITH   2,849,559
CONTROL APPARATUS
Filed March 25, 1953   3 Sheets-Sheet 1
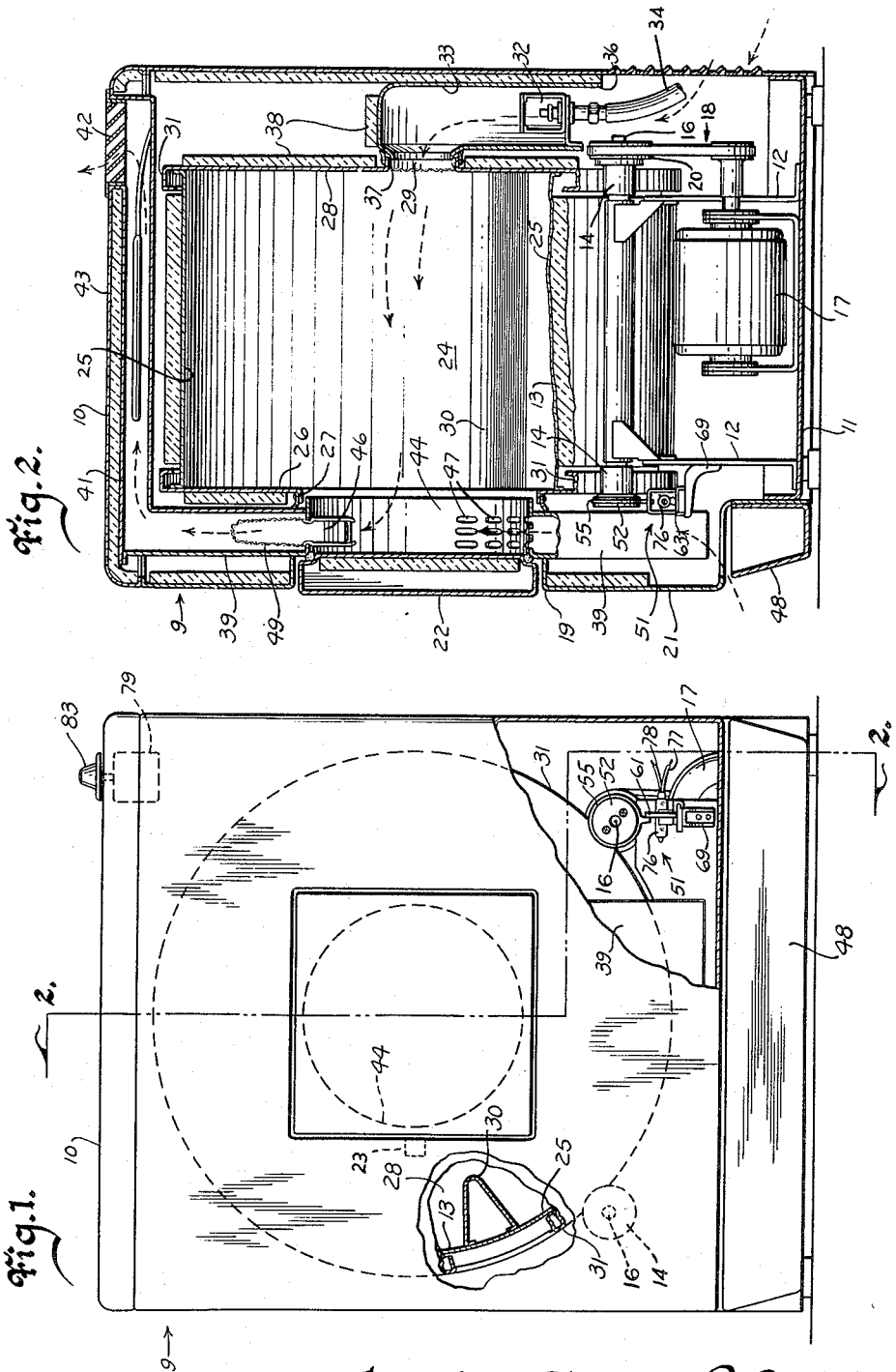
Inventor: Thomas R. Smith
by J. X. Morgan
Agent Aug. 26, 1958 T. R. SMITH 2,849,559
CONTROL APPARATUS
Filed March 25, 1953 3 Sheets-Sheet 2
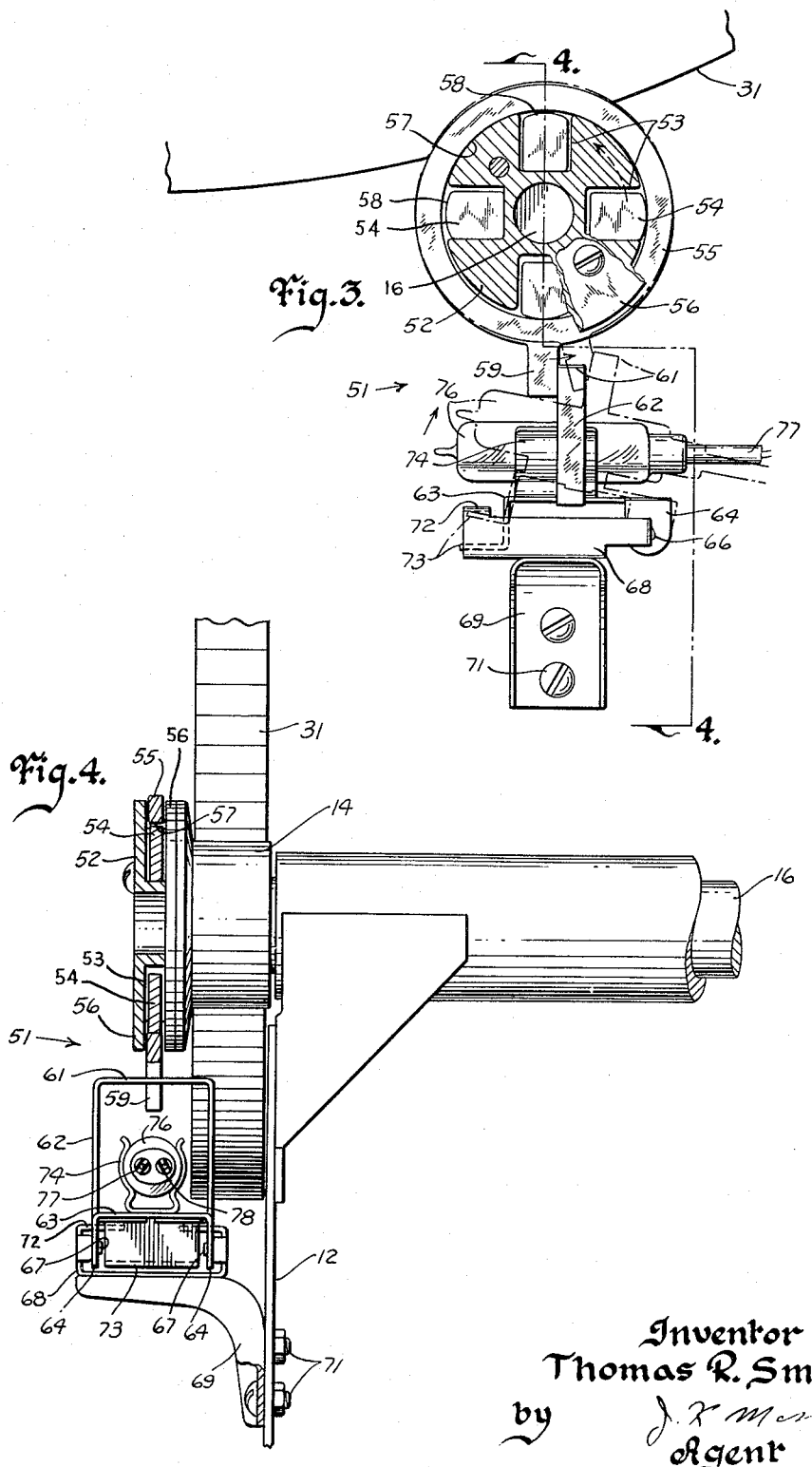
Inventor
Thomas R. Smith
by
Agent Aug. 26, 1958

T. R. SMITH 2,849,559

CONTROL APPARATUS

Filed March 25, 1953

Inventor
Thomas R. Smith
by J. X. Moser
Agent

United States Patent Office 2,849,559
Patented Aug. 26, 1958

2,849,559

CONTROL APPARATUS

Thomas R. Smith, Newton, Iowa, assignor to The Maytag Company, Newton, Iowa, a corporation of Delaware Application March 25, 1953, Serial No. 344,510

12 Claims. (Cl. 200—80)

This invention relates to control apparatus and more particularly to condition control apparatus for a rotatable member.

It is one of the objects of the invention to provide centrifugally operated mechanism which is operative above a predetermined speed of a rotatable member to condition an electric circuit for operation and below a predetermined speed to render the circuit deenergized regardless of the demands of another control apparatus.

In some installations where, for example, heat is applied to moving or tumbling fabrics or the like within a rotatable drum to dry the same, it is imperative that the source of heat be removed or controlled should for any reason the drum stop rotating or its rotation reduce to a low value, or the temperature within the drum exceed a predetermined high safe limit.

In accordance with the present invention, a rotatable drum for tumbling the fabrics to be dried is provided with heating means under the control of suitable mechanism which limits the maximum safe temperature within the drum and controls the duration of the drying cycle. In addition, the driving member for the drum has a cage, carrying loosely mounted weights, secured thereto to rotate therewith. Embracing the cage and weights is a shiftable annular ring having an outwardly projecting arm adapted to engage a shiftable bracket on which is mounted an electric switch. When the rotatable driving member exceeds a predetermined speed, centrifugal force moves the loosely mounted weights outwardly and they frictionally engage the inner periphery of the annular shiftable ring, which in turn causes the same to rotate or move therewith. Upon rotation, the outwardly projecting arm engages the bracket to actuate the switch to complete or close the contacts in a heating means circuit to condition the same for operation. As long as the driving member is rotating properly, the switch is held in its closed position by the frictional action of the weights sliding against the annular ring and the application of heat to the drier is under the control of the main control apparatus. However, should the driving member stop rotating or slow down to a low value, the weights will no longer engage the annular ring with enough force to maintain the switch closed, thus the switch is moved to open or deenergize the heating means circuit to terminate operation of the heating means and other electrical equipment, if desired.

Accordingly, it is another object of the invention to provide a tumbler type clothes drier with control means for limiting the application of heat to the drier which in turn is under the control of mechanism responsive to the speed of the tumbler.

It is yet another object of the invention to provide control means for a heating means circuit which is responsive to the speed of a rotatable member to condition the heating means circuit for operation.

It is still another object of the invention to provide a rotatable member with centrifugally operated means which frictionally engages a member to operate switch means to condition a circuit for operation.

It is another object of the invention to provide a rotatable member with a centrifugally operated member having means for frictionally operating a shiftable member which actuates a gravity responsive switch to its closed position to condition a circuit for operation.

It is another object of the invention to provide a rotatable member having heating means therefor with frictionally operated speed responsive mechanism which is responsive to the rotation of the rotatable member for controlling switch means in the heating means circuit.

It is yet another object of the invention to provide a tumbler type clothes drier with an improved simplified control arrangement which is effective to control the upper temperature limits within the drier as well as the duration of the drying cycle.

Other objects, features, capabilities and advantages are comprehended by the invention as will later appear and as are inherently possessed threby.

Referring to the drawings:

Figure 1 is an end elevational view of a tumbler type drier to which the improved speed responsive control apparatus may be applied;

Figure 2 is a longitudinal vertical sectional view of the clothes drier taken generally on the line 2—2 of Figure 1;

Figure 3 is an enlarged partial sectional view of the speed responsive control apparatus shown in Figure 1;

Figure 4 is a partial longitudinal vertical sectional view taken generally along the line 4—4 of Figure 3.

Figure 5:
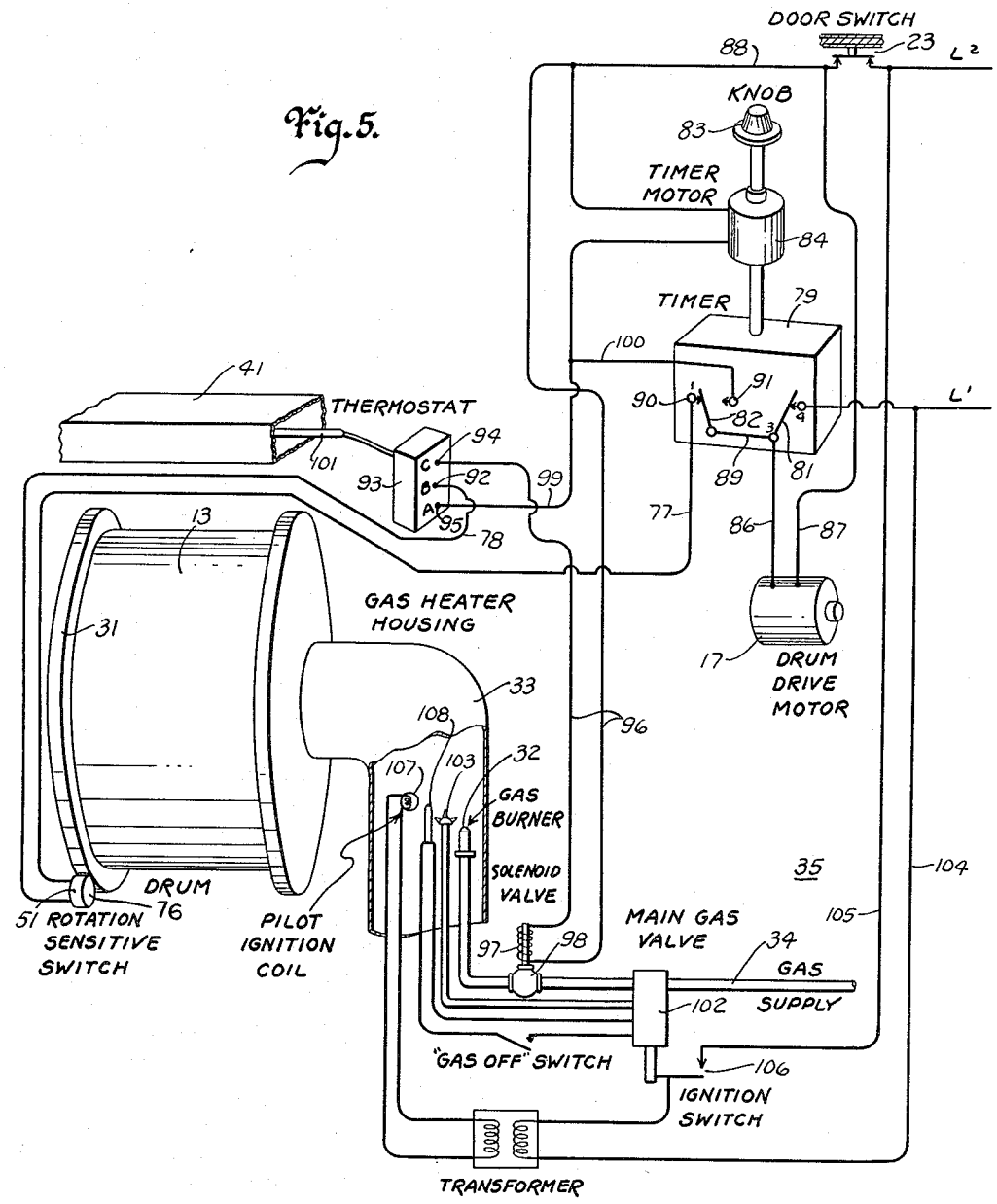
Figure 5 is a schematic wiring diagram of a control arrangement incorporating the speed responsive control member in a clothes drier.

Referring now more in detail to the drawings for one form of apparatus embodying the control features of the present invention, there is diagrammatically shown in Figures 1 and 2 a clothes drier 9 having a casing 10 secured to a base frame construction 11 for completely enclosing the operating parts of the clothes drier. Projecting upwardly from the base 11 are a pair of parallel spaced ribs 12 which provide a support for a hollow clothes receiving rotatable tumbler or drum 13, mounted for rotation about its horizontal axis within a cradle formed by four spaced flanged friction rollers 14 carried on opposite ends of a pair of parallel spaced shafts 16. The drum 13 may be rotated by means of an electric motor 17 through suitable speed reduction mechanism, such as, a belt and pulley arrangement 18 which is operatively connected to one of the shafts 16 and pair of rollers. When the motor is energized, the driven pulley 20 rotates one of the shafts 16 and the friction between the engaging portions of the rollers and drum causes the same to rotate about its horizontal axis at a considerable speed reduction; i. e., between 35 and 50 R. P. M., while the opposite shaft carrying its pair of rollers 14 merely acts as a rolling support.

The surrounding cabinet 10 has an access opening 19 provided in its front wall 21 disposed about the horizontal axis of the drum 13, and a door or closure 22 adjacent the opening 19 is adapted to be opened and closed by the operator to gain access to the drum or to seal the opening. Also, when the door is moved from one position to the other, it engages a door switch 23 for a purpose to be hereinafter described.

The horizontally mounted drum 13 within the casing and defining the drying chamber 24 is a unitary structure and includes an imperforate cylindrical wall 25, a front end wall 26, having a single centrally located access opening 27 facing the access opening 19 in the front wall of the cabinet, and a vertical rear end wall 28 spaced in parallel relation to the front wall. A plurality of lifting ribs or vanes 30 are secured to the inner periphery of the cylindrical wall 25 to tumble the clothes, and the end walls 26 and 28 are provided with circumferential flanges 31 adapted to rest on the rollers 14 and constitute the sole support for the drum in its horizontal position.

In order to evaporate the moisture in the clothing within the drum, heat must be applied thereto. One such means for heating the clothing is shown in the form of a gas burner 32 mounted in a vertical duct 33 adjacent the rear wall 28 of the drum. This burner is connected to a suitable source of supply by a conduit 34 and under the control of control mechanism, generally referred to at 35, in a manner to be hereinafter described. Primary and secondary air enters at the lower open portion 36 of the duct 33, is heated by the burning gas, mixes with the excess air, and flows through a centrally located opening 37 in the rear wall 28 of the drum to uniformly heat the clothing in the drying chamber 24 to evaporate the moisture or a high percentage thereof. Suitable insulating material 38 may be placed about the drum and duct to improve the overall operating efficiency of the drier.

Referring more particularly to Figure 2, it can be seen that the front wall 26 of the drum 13 is spaced from the front wall 21 of the cabinet 10 to provide room for an open ended vertical fluid conducting rectangular duct or conduit 39. The upper open end of the duct communicates with ambient atmosphere through a horizontal duct 41 having a grilled opening 42 in the top wall 43 of the cabinet, and the lower open end of the vertical duct 39 is disposed adjacent the base 11 in direct communication with the relatively cool air thereat. Intermediate the lower and upper ends of the duct and in alignment with the access openings 19 and 27 in the cabinet and front wall of the drum, respectively, the duct is provided with a suitable horizontal cylindrical passage 44 of approximately the same size as the access opening in the drum. This passage permits access to the interior of the drum for inserting or removing the clothing.

In order to provide means for connecting the drying chamber 24 with the ambient atmosphere and to allow the vapor evaporated from the clothing and the heated air to escape, the upper portion of the cylindrical passage 44 has a relatively large slot 46 directly communicating with the upper portion of the duct. Also, the lower portion of the cylindrical passage is provided with a series of relatively small openings or perforations 47 which directly communicate with the lower portion of the duct. While during the drying operation some of the air entering the lower open end of the vertical duct flows upwardly through the perforations 47, they primarily provide the means for permitting heavy lint thrown through the opening 27 and the vapor condensed thereabout to pass therethrough and fall downward through the open end of the duct, to be collected in a spaced combination heavy lint and moisture collecting tray 48 disposed directly therebelow. While the heavy lint falls downwardly into the collecting tray, the light airborne lint will travel with the vapor and heated air upwardly through the ducts 39; therefore, a detachable lint trap 49 of any suitable type is mounted in the upper portion of the vertical duct 39 to filter the vapor and heated air and trap the lint moving therewith.

Under the above conditions with the burner 32 supplying heated air directly into the drum 13 to evaporate moisture from the fabrics and with the drive motor 17 rotating the drum to tumble the fabrics, the heat is uniformly distributed to the fabrics. However, if for any reason the drum is stopped or moves too slowly while the heating means remains energized, there is danger of damaging the fabrics or material being treated by localized overheating, and it is to avoid conditions of this type that this invention is primarily directed.

Referring now more particularly to Figures 3 and 4, there is shown a centrifugally operated speed responsive switch or operating device, generally referred to at 51, secured to one end of one of the shafts 16 adjacent one of the rollers 14 by means of screws or the like and rotatable therewith. This device comprises a rotatable member or cage 52 having a plurality of equally spaced radially outwardly opening rectangular pockets or recesses 53 therein, four in the modification shown, and in each pocket is freely or loosely mounted a weighted member 54. A flat annular relatively shiftable or rotatable clutch element 55 loosely embraces a portion of the cage and the outwardly opening pockets 53, and relative axial shifting movement of the clutch element 55 is prevented by spaced flanges 56 of larger diameter than the inner diameter or periphery 57 of the clutch element. The weighted members 54 are uniform in size, generally rectangular in plan and cross-section, fit entirely within their respective recesses or pockets 53 and the outwardly projecting portions 58 of each weight is preferably curved on a radius slightly less than the internal radius of the inner periphery 57 of annular clutch element 55 to provide each weight with a substantially uniform contact area at all times.

Integral with the annular clutch element 55 is a radially extending and downwardly directed arm or lever 59 which eccentrically weights the loosely mounted annular element, and normally the arm is maintained in its lowermost position by gravity. One edge of the arm is adapted to engage or abut the upper closed end 61 of an inverted U-shaped switch actuating arm or lever 62 disposed below the rotatable shaft 16. This lever has its lower open ends secured to a gravity responsive tiltable or pivotal generally horizontal bracket 63 having offset downwardly directed tabs 64 with openings 66 therein disposed parallel to the shaft axis. These openings are adapted to receive inturned pivot pins or lugs 67 formed on a generally U-shaped stationary support or member 68 so that the bracket 63 may pivot thereabout on an axis parallel to the shaft axis but below and to one side of the same.

The U-shaped stationary support 68 is secured to one leg of an L-shaped stationary bracket 69 whose other leg is bolted to a side of one of the supporting webs 12 by suitable bolts 71 directly below the rotatable shaft. While one end of the U-shaped support provides the pivot for the tiltable bracket 63, the opposite end includes a pair of inturned tabs of abutments 72 to provide stop means for a forwardly directed offset portion or leg 73 formed integral with the tiltable bracket 63. The leg 73 cooperates with the stationary support 68 to not only limit the upward tilting movement of the bracket at the abutments 72 but to limit the downward movement by resting on the stationary support when the bracket is returned by gravity to its generally horizontal position. Extending upwardly from the tiltable bracket between the lever 62 is an open type clip member 74 for receiving and frictionally holding electrical switch means 76, which in the preferred embodiment is of a mercury switch type and it adds eccentric weight to the gravity responsive tiltable bracket 63. Leads 77 and 78 extending from one side of the switch are connected in series with the heating means control circuit 35 in a manner to be hereinafter described.

In this particular arrangement when the switch 76 and tiltable bracket 63 are in the generally horizontal position shown in solid lines, the contacts in the switch are open and therefore the heating means circuit 35 is maintained deenergized regardless of the demands of other control mechanism. When the bracket and switch are in the tilted position, as shown in dot and dash lines in Figure 3, the contacts in the switch are bridged or closed and the heating means circuit is conditioned for operation.

Referring now to Figure 5 for a control circuit to which the switch 76 and speed responsive mechanism 51 may be incorporated, there is shown a conductor $L_1$ extending to a suitable timer mechanism 79, including switches 81 and 82, which may be manually positioned by means of a control knob 83 and then driven by means of a timer motor 84 to sequentially operate the drier through a series of steps to complete the drying operation. From the open side of the switch 81 a conductor 86 leads to the drive or tumbling motor 17 and the circuit to the motor is completed to the line $L_2$ through conductors 87 and 88 and the door switch 23.

The heating means circuit extends from the line $L_1$ through the switch 81 in the timer 79 to a conductor 89 terminating at the common end of the double throw switch 82 having contacts 90 and 91. In the disclosed position the arm of the switch 82 is engaging contact 90. The contact 90 is connected to the speed responsive switch 76 through the conductor 77, while the opposite side of the switch is connected by means of the conductor 78 to a common contact 92 in a thermostat 93 which also includes contacts 94 and 95. The contact 94 is connected to a conductor 96 in series with a solenoid coil 97 for an "on" and "off" gas valve 98 in the gas supply pipe 34 ahead of the burner 32. From the coil 97 the conductor 96 extends to the conductor 88 which leads to the line $L_2$ through the door switch 23. The contact 95 is connected in series with the timer motor 84 through a conductor 99 which in turn is also connected to the line $L_2$ through the conductor 88. A conductor 100 extending from the contact 91 is connected to the conductor 99 ahead of the timer motor 84 so that it will also be in series with the timer motor under certain conditions to be hereinafter described.

Mounted in the horizontal portion 41 of the duct 39 is a thermostatic bulb 101 responsive to the temperature therein to alternately close and open the contacts 94 or 95. When the contact 94 is closed the solenoid 97 is conditioned for operation and the switch 95 is open to deenergize the timer motor 84, and when the contact 95 is closed the timer motor is energized and the switch 94 is open to deenergize the solenoid 97 to maintain the valve 98 closed. As mentioned previously the switch 82 in the timer 79 is double acting and when in the position shown connects the conductor 77 in series with the speed responsive switch 76, contact 94, if closed, and solenoid valve 97 to the line $L_1$, and when in its other position opens the circuit to the solenoid 97 and closes the circuit to the timer motor 84 regardless of the demands of the thermostat 93 in a manner to be hereinafter described.

Disposed in the gas supply pipe 34 ahead of the solenoid operated valve 98 is a gas control valve 102 which acts to control the supply of gas to the burner 32 and a pilot light 103 therefore. This valve is energized from the lines $L_1$ and $L_2$ through conductors 104 and 105 which also provides the means for igniting the pilot light 103 through an ignition switch 106 including the usual igniter coil 107. Suitable safety control means 108 forming no part of the invention may be included to insure proper operation of the burner 32.

From the foregoing it is apparent that energization of the heating means 32 is dependent upon the pilot light 103 being lit and the contacts in the timer 79, door switch 23, thermostat 90 and the speed responsive switch 76 all being closed.

The operation of a clothes drier mechanism incorporating the control and speed responsive mechanism is as follows:

The operator inserts the materials or fabrics to be dried through the aligned access openings 19 and 27 into the drum 13, whereupon the door 22 is closed and this action also closes the door switch 23 and conditions the motor and heating means circuit from the line $L_2$ for the operation.

Next, the operator actuates mechanism to ignite the pilot light 103 and manipulates the control knob 83 on the timer 79 to the desired position. This latter action closes the switch 81 and energizes the drive motor 17 to rotate the drum 13 through the speed reduction mechanism 18, shaft 16 and friction rollers 14 to tumble the materials to be treated. At the same time the switch 82 is moved to engage the contact 90 in the solenoid valve circuit. As the driving shaft 16 begins to rotate, that part of the speed responsive device 51 secured thereto and comprising the cage 52 and the weights 54 carried in the recesses 53 are rotated also. When at rest and at low speeds the annular shiftable clutch element 55 remains relatively stationary with respect to the rotating cage 52 and the downwardly projecting arm 59 remains in its lowermost position, as shown in solid lines in Figure 2.

While the loosely mounted weights 54 will alternately move downwardly within their recesses and engage the inner cylindrical periphery 57 of the annular shiftable clutch element 55, the friction between them is not sufficient to shift the arm 59 which is abutting one side of the lever 61 carried by the tiltable bracket 63. As the speed of the shaft 16 increases to a predetermined high value, centrifugal force acting on the weights 54 moves them outwardly and the curved ends 58 engage and are held in contact with the inner periphery 57 of the clutch element 55. Since there is only frictional contact between the weights and clutch element 55, they move relative to each other as the cage continues to drive the weights about the shaft axis. As the shaft approaches its rated speed, increased centrifugal force acting on the weights 54 increases the contact pressure against the periphery of the clutch element which in turn increases the frictional force and causes the clutch element to shift or begin to rotate counterclockwise with the cage, as shown in Figure 3. As the clutch element 55 begins to rotate, the downwardly projecting arm 59 engages the closed end 61 of the lever 62 and moves the same to the right.

Upon movement of the lever, the gravity responsive tiltable bracket 63 pivots about the eccentrically located pivot pins 67 on an axis parallel to the shaft axis and its forward or free end is elevated against the force of gravity until the extension 73 contacts the abutments 72 provided by the stationary support 68. Upon contacting the abutments, further tilting movement of the bracket 63 is arrested and the further rotation of the clutch element 55 is stopped by the upstanding lever 61. From this point on the weights move relative to the clutch element and the arm 59 is held in contact with the lever 61 by the frictional force of the weights acting against the inner cylindrical surface 57 of the clutch element. When the free end of the tiltable bracket is elevated, the mercury in the switch 76 will move toward the low end of the switch and in so doing bridge the contacts to close the heating means circuit to start the heating or treating operation, assuming, of course, that the thermostat contacts 92 and 94 are closed.

As long as the shaft 16 is rotated at its rated speed, the weights 54 will maintain the switch 76 in its tilted position, and under normal conditions the mercury switch has no further influence on the heating means circuit in that either the timer 79 or thermostat 93 operates at the proper time to open the heating means circuit. The centrifugal control device is primarily a safety device, which comes into play under adverse conditions, such as, for example, if the drive motor 17 should fail for any reason, the belt break or the shaft 16 for tumbling the drum drops to a predetermined low value. Should any of the above conditions occur, it is obvious that the materials being dried will fall to the bottom of the drum 13 and tend to remain there, and with heat being applied directly to the materials there is danger of damaging or destroying the same unless the application of heat thereto is terminated quickly.

Under the above described conditions, as the shaft speed decreases the frictional force between the weights 54 and shiftable clutch element 55 decreases also, and when the speed reaches a predetermined low value the weights no longer provide enough friction to the clutch element to hold the tiltable bracket 63 against the abutment 72. Thus, gravity acting on the eccentrically mounted bracket 63 overcomes the frictional force of the weights 54 and moves the arm 59 in a clockwise direction, as viewed in the drawings, until the bracket is in its horizontal position with the forwardly projecting arm 73 engaging the stationary support 68 to limit its downward movement. As the switch 76 approaches its horizontal position, the mercury moves away from the contacts and opens the heating means circuit and deenergizes the solenoid 97 to cut off the gas at the valve 98 and thus the supply of heat to the drum 13, to thereby protect the materials from possible damage, regardless of the demands of the remaining control apparatus.

As mentioned previously, the speed responsive device 51 is a safety feature. Under normal conditions of operation, assuming the timer 79 has been turned to the position shown and with the thermostat 93 calling for heat, the contacts 92 and 94 are closed and the solenoid 97 is energized to maintain the valve 98 open to supply heat to the drum 13 to dry the materials therein. During this interval the contact 95 on the thermostat is open along with the contact 91 at the double throw switch 82; therefore, the timer motor 84 is deenergized and will remain so as long as the exhaust temperature of the heated air and vapor remains below the selected setting. In this manner the size of the load as well as the adjustment of the timer for a timed drying operation is not critical.

From the burner 32 the heated air and products of combustion pass through the opening 29 in the rear wall 28 of the drum, intermingles with the tumbling clothing and evaporates the moisture therein. The heated moisture laden air then passes through the opening 27 in the front wall 26 and rises into the vertical duct 39, moves rearwardly through the horizontal duct 41 and is discharged into the ambient atmosphere through the grilled opening 42 in the top wall 43 of the cabinet.

As the major portion of the vapor is evaporated from the clothing the temperature of the heated air and gases flowing through the exhaust duct 41 increases, and upon attaining a predetermined high temperature the thermostat bulb 101 acts to open the heating means circuit at the contact 94 to deenergize the solenoid 97 to cut off the supply of gas to the burner 32 and to close the contact 95 to energize the timer motor 84. Upon energization of the timer motor, mechanism in the timer 79 (not shown) is advanced toward its "off" or open circuit position.

Continued tumbling of the drum with no heat applied cools the contents of the same and in turn cools the bulb 101 in the duct which acts to open the contact 95 to deenergize the timer motor 84 and close the contact 94. Upon closing of the contact 94 the valve 98 is again opened and the pilot light 103 reignites the burner to supply additional heat to the drum. The number of cycles the thermostat 93 takes to cut off and on the supply of heat depends upon the design of the timer. While cyclic operation need not be incorporated in the control, its use improves the overall efficiency of the drier.

After the contact 94 has been opened and closed for one or more cycles the timer shifts the double acting switch 82 from the contact 90 to its second position whereat it engages the contact 91. This action permanently opens the heating means circuit regardless of the demands of the thermostat and thereafter the drum is continuously rotated for a predetermined length of time to cool the clothing in the drier for safe handling. During the cool-down period the timer motor 84 is continuously energized through either the contact 95 on the thermostat or the contact 91 at the switch 82.

At the end of the predetermined cool-down period the timer motor acts to open the timer and drive motor circuits at the switch 81, at which time the operator need but open the door 22 and remove the dried clothing. If additional clothing is placed in the drier the same procedure is followed as previously described. Of course, if at any time the door 22 is opened during the drying operation the entire operation is stopped, except extinguishing the pilot light 103. Upon closing of the door the drying operation will be resumed as soon as the drive shaft 16 reaches its predetermined speed and actuates the tiltable switch 76 at the speed responsive device 51.

From the foregoing it can be seen that an improved control and safety mechanism has been provided to prevent damage to materials being dried, which is responsive to the speed of rotation of one of the members in the driving arrangement to prevent the application of heat to the materials until the mechanism approaches its proper speed, and responsive below a predetermined speed to interrupt the application of heat. Also, that a simplified speed responsive arrangement has been provided which utilizes freely mounted centrifugally operated weights for frictionally driving a clutch element for actuating a gravity responsive switch member which is simple in construction, positive in operation and may be readily attached to any rotatable member.

By properly proportioning the weights and actuating member, the device may be designed to operate at practically any desired speed, and under some conditions of operation the switch need not be gravity responsive but could readily be of the spring biased type.

While the speed control device has been described in connection with a rotatable shaft for tumbling apparatus for driers, it is to be understood that this arrangement is set forth by way of example only and that a speed control device of this type may find other applications and locations and need not necessarily be used for controlling a heating means circuit.

While I have herein described an illustrative embodiment of the invention, it is to be understood that the invention is not limited thereto but may comprehend other constructions, arrangements of parts, details and features without departing from the spirit of the invention.

I claim:

1. A speed responsive circuit control comprising, a rotatable cage having a plurality of outwardly opening recesses carrying centrifugally operated coupling members having arcuate ends, a shiftable element loosely fitted around said cage and having a cylindrical surface frictionally engaged by said arcuate ends of said coupling members for movement thereby about the rotational axis of said cage, switch means movable from a first to a second position by said element, and means for rotating said cage to shift said element about said rotational axis and move said switch means from said first position into said second position.

2. A speed responsive circuit control comprising, a rotatable cage having a plurality of outwardly opening recesses carrying centrifugally operated coupling members having arcuate ends, a shiftable gravity-positioned element loosely fitted around said cage and having an inner cylindrical surface frictionally contacting said arcuate ends of said coupling members for rotational movement thereby, a switch, a movable arm controlling said switch and engaging said element, and means for rotating said cage to shift said element about the rotational axis of said cage to move said arm.

3. A speed responsive circuit control comprising, a switch, a shaft rotatable about an axis, an element controlling said switch and movable about said axis, a cage member secured to said shaft and carrying a plurality of recesses transverse to said axis, coupling members in said recesses, said coupling members having arcuate ends frictionally engaging said element for moving said element about said axis to actuate said switch upon rotational movement of said shaft.

4. A speed responsive circuit control comprising, a support, bracket means pivoted on said support, a switch supported on and actuated by pivotal movement of said bracket means, a rotatable shaft, a gravity-positioned element contacting said bracket means and having an inner cylindrical surface positioned concentrically of said shaft, and centrifugal coupling means between said shaft and said element for moving said element when said shaft is rotated at a predetermined speed said centrifugal coupling means including a rotatable cage fixed on said shaft and having a plurality of radial recesses housing coupling members having arcuately shaped ends frictionally engaging said inner cylindrical surface during rotation of said shaft.

5. A speed responsive circuit control comprising, a switch having first and second positions, a first member rotatable about an axis and carrying a plurality of recesses transverse to said axis, a second member having an inner cylindrical periphery concentric to said axis and lying in the same rotational plane as said first member, movable coupling members confined within said recesses by said second member and cooperating with said inner periphery to form a centrifugally operated frictional coupling between said first and second members, means on said second member for moving said switch from said first to said second position, and shaft means for rotating said first member.

6. A speed responsive circuit control comprising, a rotatable member, a switch biased into a first of two positions, a coupling element having an inner cylindrical periphery and carrying a gravity-positioned ear controlling said switch, outwardly directed radial recesses in said rotatable member, said recesses carrying centrifugally responsive coupling members contacting said inner periphery and frictionally coupling said rotatable member to said element, and shaft means for rotating said rotatable member to increase the frictional forces acting between said coupling members and said inner periphery.

7. A speed responsive circuit control comprising, a switch, a cage rotatable about an axis, said cage having a plurality of outwardly opening recesses carrying centrifugally operated coupling members having arcuate ends, a shiftable element loosely fitted about said cage and shiftable about said axis, said element embracing at least a portion of said outwardly opening recesses so as to be contacted by the arcuate ends of said coupling members to shift said element about said axis, said cage having side flanges positioned parallel to said shiftable element and cooperating therewith to confine said coupling members within said recesses, and switch means movable from a first to a second position by said rotatable element.

8. In an automatic switch control, centrifugally responsive means for securement to a rotary shaft and movable a limited distance radially of the shaft in response to shaft speed, a pivoted member contacting said means, said member movable in a direction normal to the axis of said shaft, and an electrical switch directly actuated by movement of said pivoted member.

9. In an automatic switch control, centrifugally responsive means for securement to a rotary shaft and movable a limited distance radially of the shaft in response to shaft speed, an arcuate member at least partially encircling said means and in contact therewith movable in a direction normal to the axis of said shaft, and switch means directly actuated by said arcuate member.

10. In an automatic switch control, centrifugally responsive means for connection to a rotary shaft and movable a limited distance radially of the shaft in response to shaft speed, a ring member concentric with said means and mounted to move in a plane normal to the shaft axis, and an electrical switch directly actuated by a predetermined movement of said ring.

11. In an automatic switch control, centrifugally responsive means secured to a rotary shaft and movable a limited distance radially of the shaft in response to shaft speed, means for rotating said shaft, a pivoted member contacting said centrifugally responsive means, said pivoted member movable from a first position to a second position when said shaft is rotated above a predetermined speed, and an electrical switch directly actuated by movement of said pivoted member.

12. In an automatic switch control, centrifugally responsive means connected to a rotary shaft and movable a limited distance radially of said shaft in response to the shaft speed, means for rotating said shaft, a ring member concentric with said means and mounted to move from a first position to a second position when said shaft is rotated above a predetermined speed, and an electrical switch directly actuated by a predetermined movement of said ring member.

References Cited in the file of this patent

UNITED STATES PATENTS

| | | |
|---|---|---|
| 1,910,245 | Harrelson | May 23, 1933 |
| 2,100,710 | Dendel | Nov. 30, 1937 |
| 2,141,772 | Stadler | Dec. 27, 1938 |
| 2,187,202 | Henry | Jan. 16, 1940 |
| 2,187,207 | McCabe | Jan. 16, 1940 |
| 2,314,748 | White | Mar. 23, 1943 |
| 2,410,085 | Lambert | Oct. 29, 1946 |
| 2,486,315 | Morris | Oct. 25, 1949 |
| 2,505,041 | Gorsuch | Apr. 25, 1950 |
| 2,590,808 | Wagner | Mar. 25, 1952 |

FOREIGN PATENTS

| | | |
|---|---|---|
| 469,241 | Germany | Nov. 22, 1928 |